United States Patent [19]

Chopping et al.

[11] Patent Number: 4,864,556
[45] Date of Patent: Sep. 5, 1989

[54] SYNCHRONIZATION ARRANGEMENTS FOR A DIGITAL TELECOMMUNICATIONS EXCHANGE SYSTEM

[75] Inventors: Geoffrey Chopping, Minster; Milan Z. Maric, Broadstone, both of England

[73] Assignee: The Plessey Company plc., Essex, England

[21] Appl. No.: 166,931

[22] Filed: Mar. 11, 1988

[30] Foreign Application Priority Data

Mar. 11, 1987 [GB] United Kingdom ............... 8705771

[51] Int. Cl.$^4$ .......................................... H04J 3/14
[52] U.S. Cl. .............................. 370/16; 370/105.1
[58] Field of Search ................ 370/16, 13, 14, 100; 340/825.01, 827; 371/8

[56] References Cited

U.S. PATENT DOCUMENTS

| | | | |
|---|---|---|---|
| 3,920,914 | 11/1975 | Regnier et al. | 370/16 |
| 4,071,702 | 1/1978 | Charransol et al. | 370/16 |
| 4,455,645 | 6/1984 | Mijioka et al. | 370/16 |
| 4,654,842 | 3/1987 | Coraluppi et al. | 370/16 |
| 4,763,316 | 8/1988 | Schaich et al. | 370/16 |

Primary Examiner—Douglas W. Olms
Attorney, Agent, or Firm—Fleit, Jacobson, Cohn, Price, Holman & Stern

[57] ABSTRACT

The synchronization arrangement includes a waveform and synchronization information generator to supply synchronization information for transmission with a data stream over digital switching networks. The synchronization information includes two different patterns, phased displaced with respect to each other. Interfaces connect peripheral devices to the networks and are adapted to detect a validate the synchronization information. The checks made are in respect of detecting both patterns, the amount of phase displacement, and the correct sequence. If the synchronization information is invalid, the detecting interface selects a data stream from another network exclusively for use by the corresponding peripheral device.

6 Claims, 20 Drawing Sheets

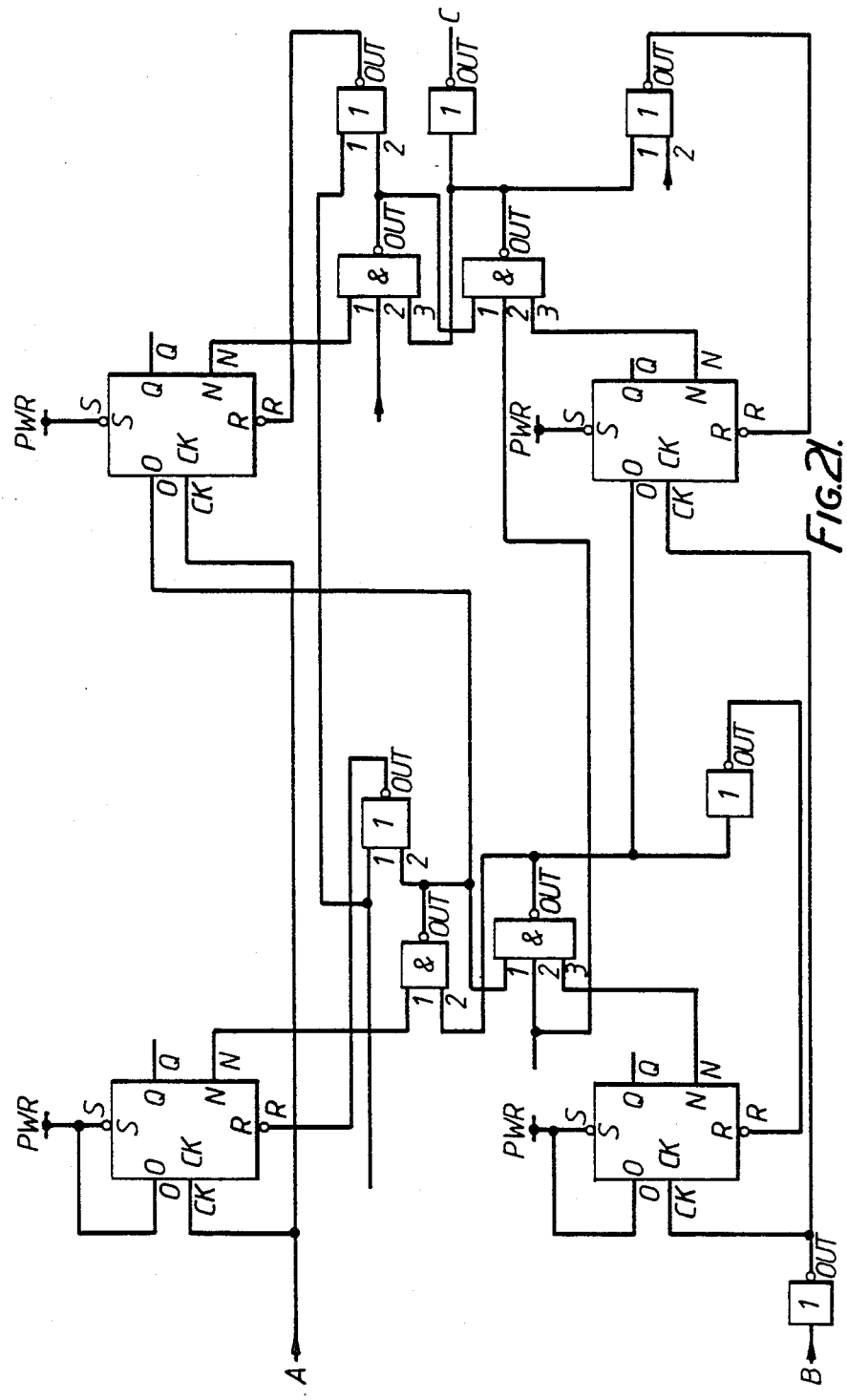

4,864,556

SYNCHRONIZATION ARRANGEMENTS FOR A DIGITAL TELECOMMUNICATIONS EXCHANGE SYSTEM

FIELD OF THE INVENTION

The present invention relates to a synchronisation arrangement for a digital telecommunications exchange system.

This invention finds particular utility in digital telecommunications exchange systems of the type employing digital switching networks which cater for the switching of two separate transmission paths through the switching network to achieve bothway communication.

DESCRIPTION OF THE PRIOR ART

To provide a secure switching network it is known to duplicate such switching networks to provide two entirely separate security planes (security plane 0 and security plane 1) which are arranged to operate in synchronisation. Many peripheral devices are connected to the duplicated switching network and are usually unsecured (ie. they are not duplicated), and require to receive a synchronised serial multiplex/data stream from one only of the switching networks. In the event of loss of synchronisation of the serial multiplex data stream through this switching network, there is an immediate requirement that the peripheral device must receive a synchronised serial multiplex data stream from the other switching network automatically.

SUMMARY OF THE INVENTION

The arrangement of this invention concerns the generation detection and validating of synchronisation information and in the event of invalid synchronisation information being indicated on the currently used serial multiplex data stream, the enabling of means to select the synchronised serial multiplex data stream.

STATEMENT OF THE OBJECT OF THE INVENTION

According to the present invention there is provided a synchronisation arrangement for a digital telecommunications exchange system of the type including dual secure digital switching networks, the arrangement comprising, secure waveform and synchronisation information generating means for supplying secured synchronisation information for transmission within a serial multiplex data stream over each digital switching network of said secure digital switching network, the synchronisation information including first and second different independently encoded synchronisation patterns which are phase displaced with respect to each other by a predetermined amount, and a plurality of interface means connected between said secure digital switching networks and a corresponding plurality of peripheral devices, wherein each interface means is adapted to detect and validate said synchronisation information from each secure digital switching network independently by checking for (a) first and second encoded synchronisation patterns, (b) the predetermined amount of phase displacement and (c) that the first and second synchronisation patterns are in the correct sequence, wherein in the event of the synchronisation information from one secure digital switching network being invalid, said interface means is enabled to select the synchronised serial multiplex data stream from the other secure digital switching network exclusively for use by its corresponding peripheral device.

BRIEF DESCRIPTION OF DRAWINGS

The invention will be more readily understood from the following description of an exemplary embodiment which should be read in conjunction with the accompanying drawings in which.

DESCRIPTION OF THE PREFERRED EMBODIMENT

Figure 1:
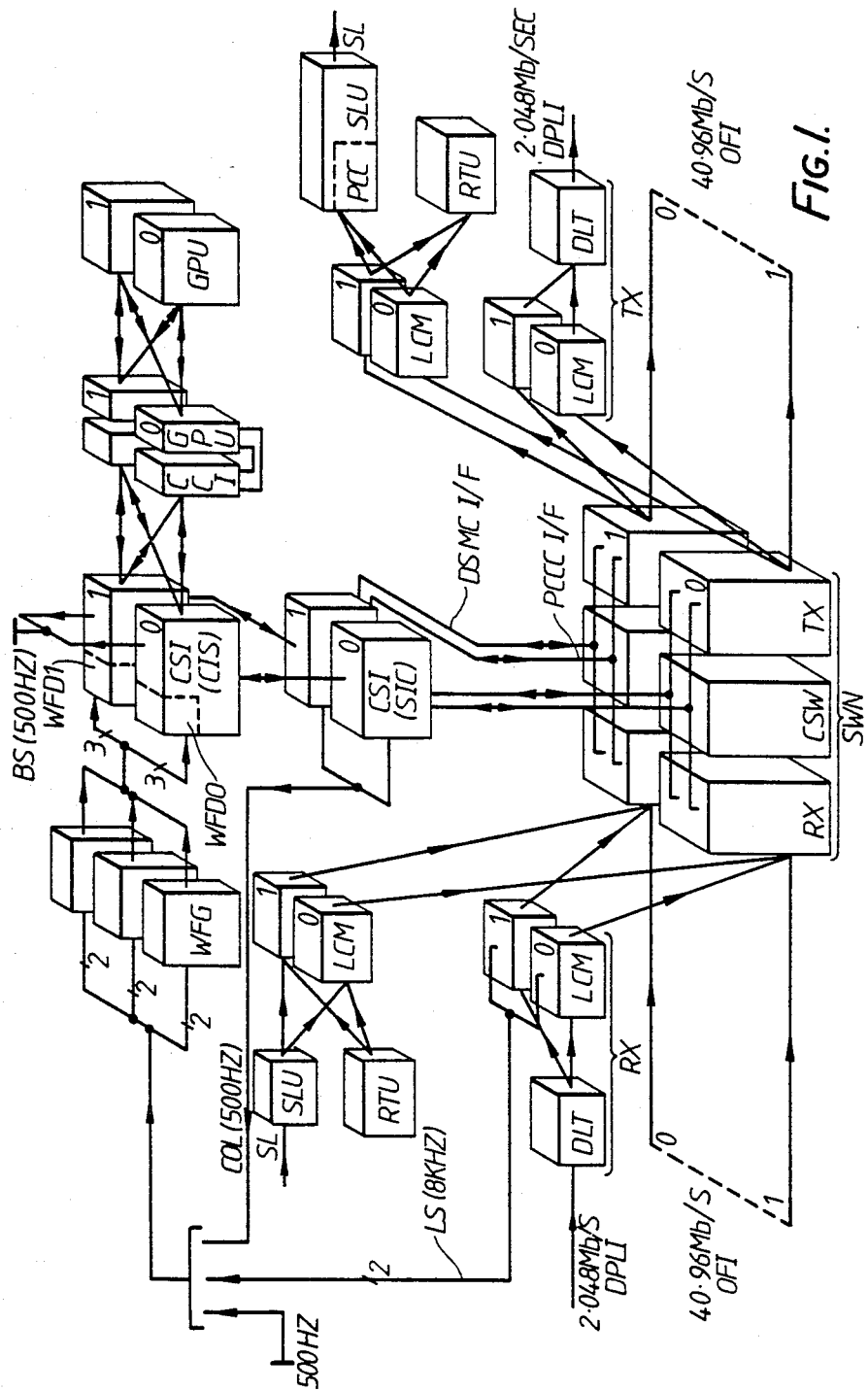
FIG. 1. shows a block schematic diagram of a line frame of a digital subscriber switching system including arrangements in accordance with this invention.

Referring now to the drawings, this invention finds utility in a digital switching system known as System 'X'. Details of the digital switching sub system of System 'X' are disclosed in an article by A.S. PHILIP in the publication, Systems Technology No. 32 September 1979, and it is in this system that the present invention is embodied by way of illustrative example.

Line Frame.

Referring to FIG. 1, this shows a block schematic diagram of a line frame. The main feature of this arrangement is the switchblock or switching network SWN which is duplicated for security purposes. It will be seen that two separate identical networks are provided each comprising receive time switch RX, a central space switch CSW and a transmit time switch TX all of which are interconnected. Each of these blocks have their own Control/Switch Interfaces CSI which give access to their respective General Processor Units GPU.

On the receive side RX of the switching network SWN there is a 40.96 M bit/sec optical fibre interface OFI and it will be seen that while the line communication multiplexers LCM are duplicated, and are therefore secured, the remote terminal units RTU, the subscribers line units SLU, and the digital line termination units are not, and are therefore, unsecured.

On the transmission TX side of the switching network SWN the arrangement of the various units is similar to the receive side. On this side of the switching network SWN is shown a peripheral card controller PCC associated with the peripheral subscribers line unit SLU. It is the PCC which is arranged to detect and validate synchronisation signals and to distribute such signals and clock signals from one serial multiplex data stream only to the unsecured peripherals. The source of the clock and synchronisation signals is the triplicated waveform generator WFG and the wveform distribution arrangements WFD1 and WFD0 which will now be discussed.

Waveform Distribution and Structure.

Structure.

Figure 2:
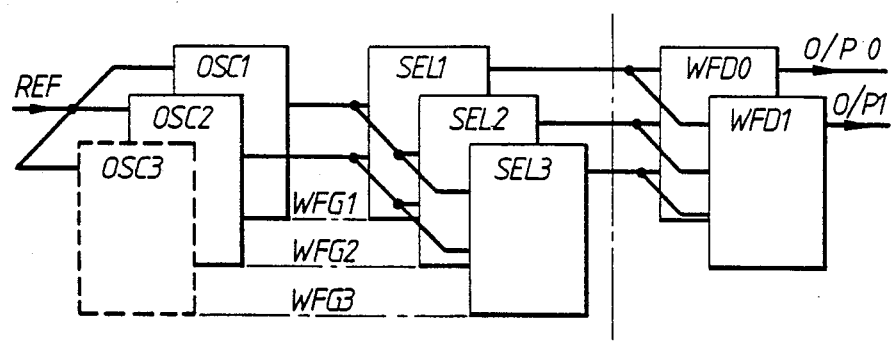
FIG. 2. shows a block schematic diagram of the waveform generation and distribution arrangements in accordance with this invention.

Referring to FIG. 2, the waveform generation and distribution arrangements comprise triplicated Waveform Generators WFG1, WFG2 and WFG3 driving duplicated waveform distribution WFD0 and WFD1. Each waveform generator contains the following:

(i) An oscillator capable of locking on to several external references OSC1, OSC2, and OSC3.

(ii) A selection mechanism for choosing the appropriate reference REF for the locked oscillator.

(iii) A selector, for selecting one of the selectors SEL1, SEL2, and SEL3 when one of them agrees with the other two selectors to determine which oscillator output will drive the waveform distribution .

Each waveform distribution contains the following:

(i) Majority decision logic (not shown) to process the three clocks received from the selectors SEL1, SEL2 and SEL3.

(ii) Generation means (not shown) for generating clocks, in addition to this provided by the used waveform generator.

The waveform generator provides an 8 kHz waveform and a 500 Hz waveform to the waveform distribution which generates the other frequencies required.

Security.

The following features are provided to ensure the secure operation of the waveform generators and the waveform distribution.

Reference Security.

The waveform generator is able to lock to one of two external reference source types REF, 500 Hz which is derived from a host subsystem and 8 kHz which is derived from a digital line termination subsystem. If none of the above are available, then the waveform generator uses an internal oscillator.

For security at least two external references are available.

Phase Locked Oscillator Security.

Two oscillators are required, one of which normally has its output distributed to switch and control planes. This oscillator is termed the worker. The other is termed the standby. Note that although there are three waveform generators, ie. three oscillators, only two are selectable. The single fault philosophy indicates that the third is never uses.

Selector Security.

Triplicated selectors are provided, one on each waveform generator. They decide which of the two oscillators is worker and which is standby. They also decide wheih external reference (if any) the worker oscillator will follow. The standby oscillator follows the worker oscillator.

Distribution.

Timing information is distributed across the control/switch or switch/peripheral boundaries by encoding it into a 2.048 Mb/s data stream. This information is passed, via the waveform distribution, to the duplicated system eventually meeting at a common point on the peripheral known as the Peripheral Card Controller (PCC).

Synchronisation Distribution

Data and synchronisation information is passed across the control/switch and switch/peripheral boundaries by a 40.96 Mbit/s serial highway consisting of various multiplexed data streams. At the receiving end of the highway any frequency below 40.96 MHz can be derived by binary division of the 40.96 MHz clock. However to achieve synchronisation between planes a low frequency sync pattern is also transmitted. The sync pattern is generated by the Control Interface to the Switch (CIS), FIG. 1 and consists of two bit-interleaved 1.024 Mbit/s stream to produce the 2.048 Mbit/s data. Each 1.024 Mbit/s stream is as follows:

(a) One stream comprises of continuous 1010101010 etc. This provides a simple pattern for a sync detector to lock onto when searching a multiplexed stream for the 2.048 Mbit/s sync data, as well as providing a rapid indication of errors.

(b) The other stream comprises four patterns each of 8 bits representing the low frequency synchronisation signals, e.g. frame start and multiframe sync, these are Pattern A, Pattern B, Pattern 1(one) Pattern 0(zero). Pattern A is always preceeded by Pattern 1 and are collectively referred to as Sync A. Pattern B is also preceeded by Pattern 1 and are collectively referred to as Sync B. Sync A and Sync B are separated by six Pattern 0's.

TABLE 1

| Sync A Z Z Z Z Z Z Sync B Z Z Z Z Z Z Sync A | | | | |
|---|---|---|---|---|
| | | | | — — —Time |
| 11111111001100S1 | | 11111111110011S1 | | 000EE000 |
| Pat. 1 | Pat. A | Pat. 1 | Pat. B | Pat. Zero |

Bit E in Pattern Zero can be used in the Transmit TX direction to convey additional information if necessary, however the PCC does not validate these bits. The Sync A and Sync B format are used to transmit the 8 kHz and 500 Hz synchronisation pulses. Bit S is a binary coded pattern to identify the 500 Hz sync signal as shown in table 2:

TABLE 2

| S | Signal Type |
|---|---|
| 0 | 500 Hz (low) |
| 1 | 500 Hz (high) |

Sync B is used as the system reference. Sync A is phase displaced or skewed with respect to Sync B by $\frac{1}{2}$ (one half) frame.

Thus the 2.048 Mbit/s bit-interleaved pattern takes the form shown in table 3:

TABLE 3

| BIT 0 | BIT 1 | BIT 2 | BIT 3 | BIT 4 | BIT 5 | //BIT128 | BIT129 | BIT130 |
|---|---|---|---|---|---|---|---|---|
| Sync A | 0 | Sync A | 1 | Sync A | 0 | //Sync 3 | 0 | Sync B |
| Bit 0 | | Bit 1 | | Bit 2 | | //Bit 0 | | Bit 1 |
| | | | | | | | | — — —Time |

Some synchronisation patterns are internally looped around to provide synchronisation back to the source. This ensures that timing on a particular interface is controlled from one point.

Peripheral Card Controller.

Figure 3:
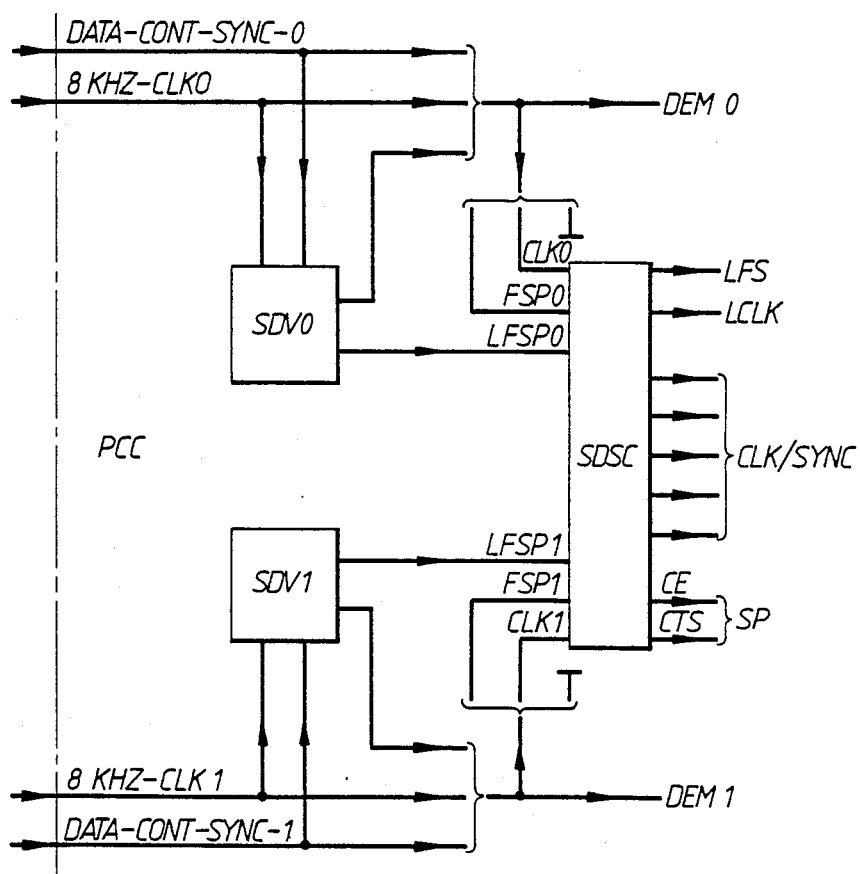
FIG. 3. shows a block schematic diagram of a portion of a peripheral card controller or interface means in accordance with this invention.

Referring to FIG. 3 which shows a block schematic of a portion of the peripheral card controller PCC, concerned with the present invention. The three main blocks shown are the Sync Detect and Validate (plane '0') SDVO the Synch Detect and Validate (plane '1') SDV1 and the Select and Distribute Sync and Clocks SDSC.

Input to the PCC is taken from the duplicated area of the switching network (see FIG. 1). Extracted from the data stream of plane '0' DATA-CONT-SYNC-0 and 8 kHz-CLKO and from plane '1' DATA-CONT-SYNC-1 and 8 kHz-CLK1. These represent 2.048 Mbit/sec control (CONT) and synchronisation (SYNC) frame structured serial multiplex streams while the DATA represents an 8.192 Mbit/sec serial multiplex comprising four 2.018 Mbit/sec streams which are bit interleaved whereas the 8 kHz (CLKO) (CLK1) are 8 kHz clock signals.

These signals are fed to the appropriate Sync Detect and Validate blocks SDVO and SDV1 respectively and also to demultiplexers DEM0 and DEM1 respectively (not shown) concerned with other functions within the peripheral card controller.

In the two Sync Detect and Validate blocks clock CLK0 and CLK1 are detected together with Frame Sync pulses FSP0 and FSP1 in addition to with low frequency sync pulses LSP0 and LSP1. These are input to the Select and Distribute Sync and Clocks block SDSC where the various signals are selected from one only of the serial multiplex data streams for distribution to the peripheral card controller and the peripheral to which it is associated. Some signals are indicated as local clock LCLK, low frequency signal LFS, clock and Sync CLK/SYNC. CE indicates clock error signals and CTS indicates current time slot signal.

It should be understood that the blocks SDV0, SDV1 and SDSC of the PCC (See FIG. 3) contain various standard type counters, registers D-type toggles together with standard logic mechanisms. As will be seen from the control algorithm progression diagrams (FIG. 4 to FIG. 19 a list of which follows) a synchronous counter is provided including frame, comparison and bit (3LSB) sections in addition to sixteen bit A and B pattern registers. Drop-out counters (D/O), slip counter (decode 7) are also provided together with numerous memory devices (1-0-1 not OK). etc.

If the Sync A and Sync B waveforms are generated by a single unit then one failure can generate phase problems.

If the wrong clock is used to drive the link the gaps between Sync A and Sync B will not contain the correct number of bits. To ensure that the peripheral card controller can have confidence in the integrity of the phase of the synchronisation information, each waveform distribution arrangement WFD has two independent majority voters receiving the three 8KHz clocks from the three selectors. One majority voter causes Sync A to be generated, and the other majority voter causes Sync B to be generated. The Sync A and Sync B waveforms are independently inserted into the output O/PO (O/OP1 for the plane 1 WFD).

Therefore, any single fault in the generation of a Sync pattern or the frequency synthesis function performed by the WFD will cause either a pattern to be corrupted or displaced. The recipient of the waveform is able to determine if it is a good or corrupt waveform. The waveform can be multiplexed and demultiplexed and passed through several distribution stages with differing rates without its integrety being lost.

At a peripheral card controller PCC, data is not necessarily taken from the same plane as the clock and synchronisation. The two planes therefore must be held within a defined relative phase relationship which ensures that if an 8 KHz reference is corrupted and therfore its phase position questionable, it can be detected and rejected.

If the Sync A and Sync B relationship/checks fail the whole synchronisation stream is rejected. If a worker oscillator fails the synchronisation streams are swopped at the peripheral card controller PCC.

Clock and synchronisation

Figure 4:
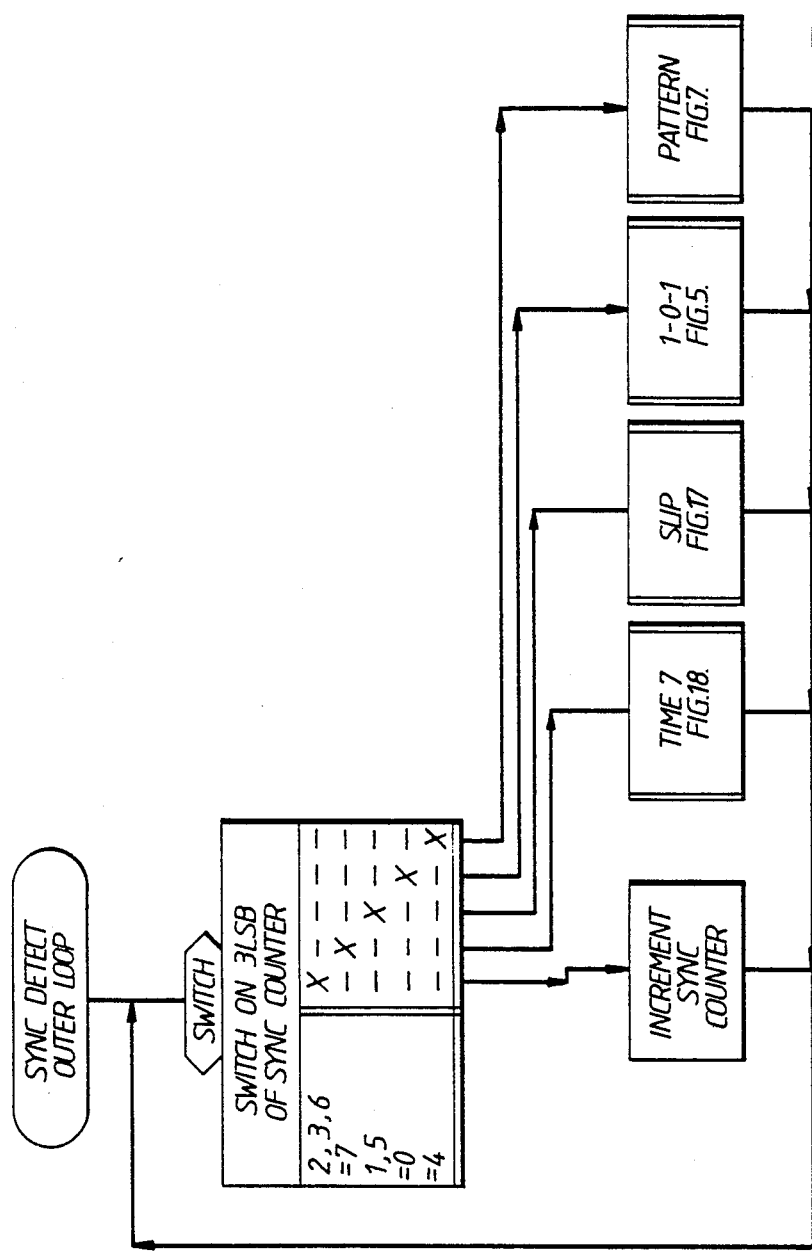
FIG. 4 to FIG. 19 show the progression charts of the control algorithm concerning the operation of the peripheral card controller in accordance with this invention.
Figure 5:
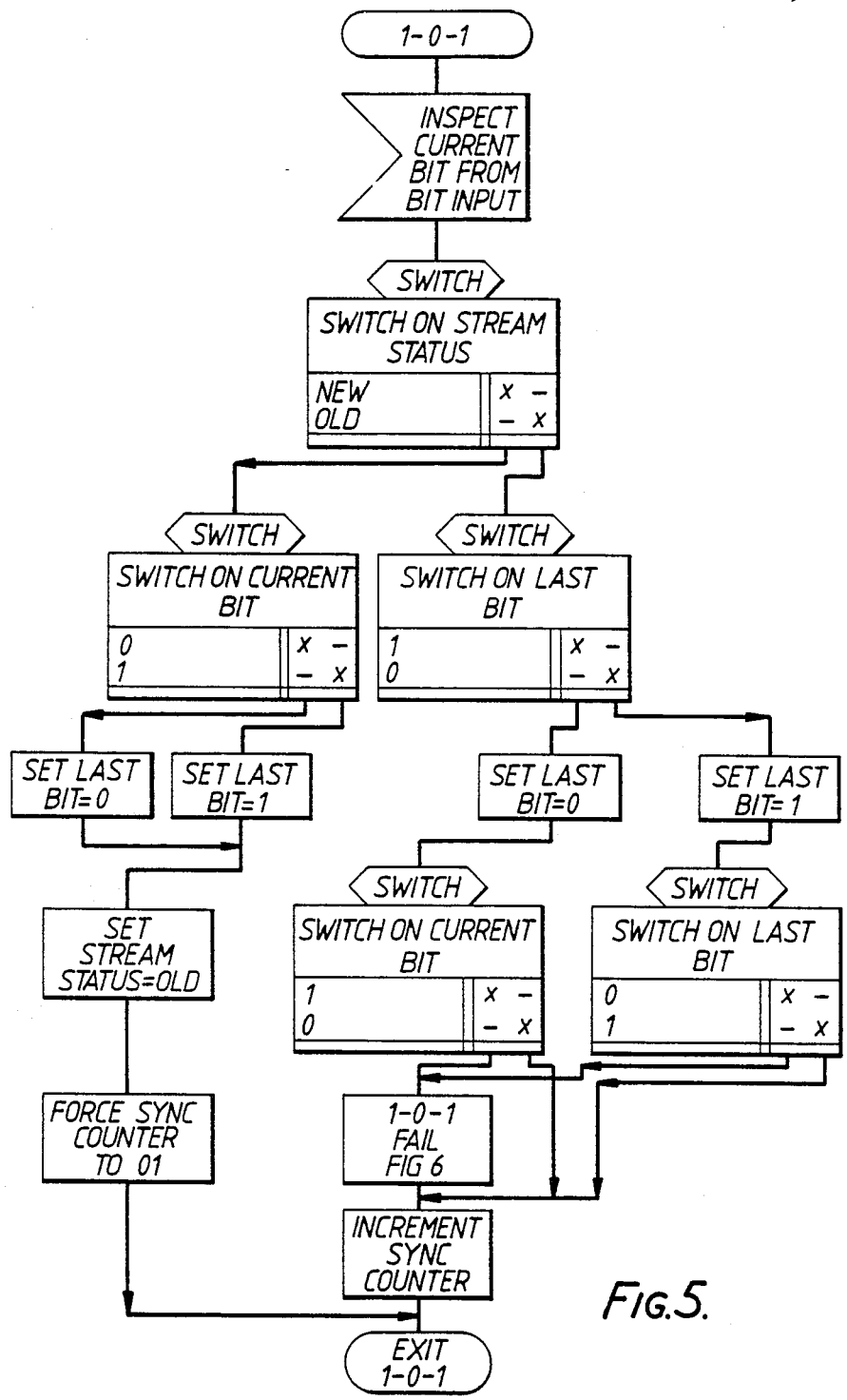
Figure 6:
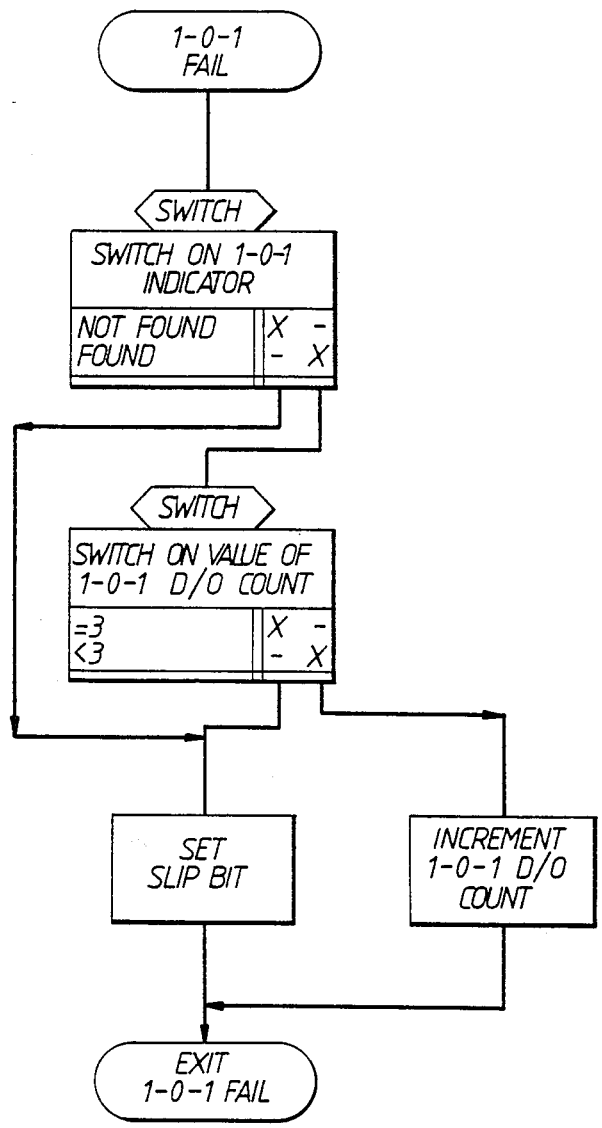
Figure 7:
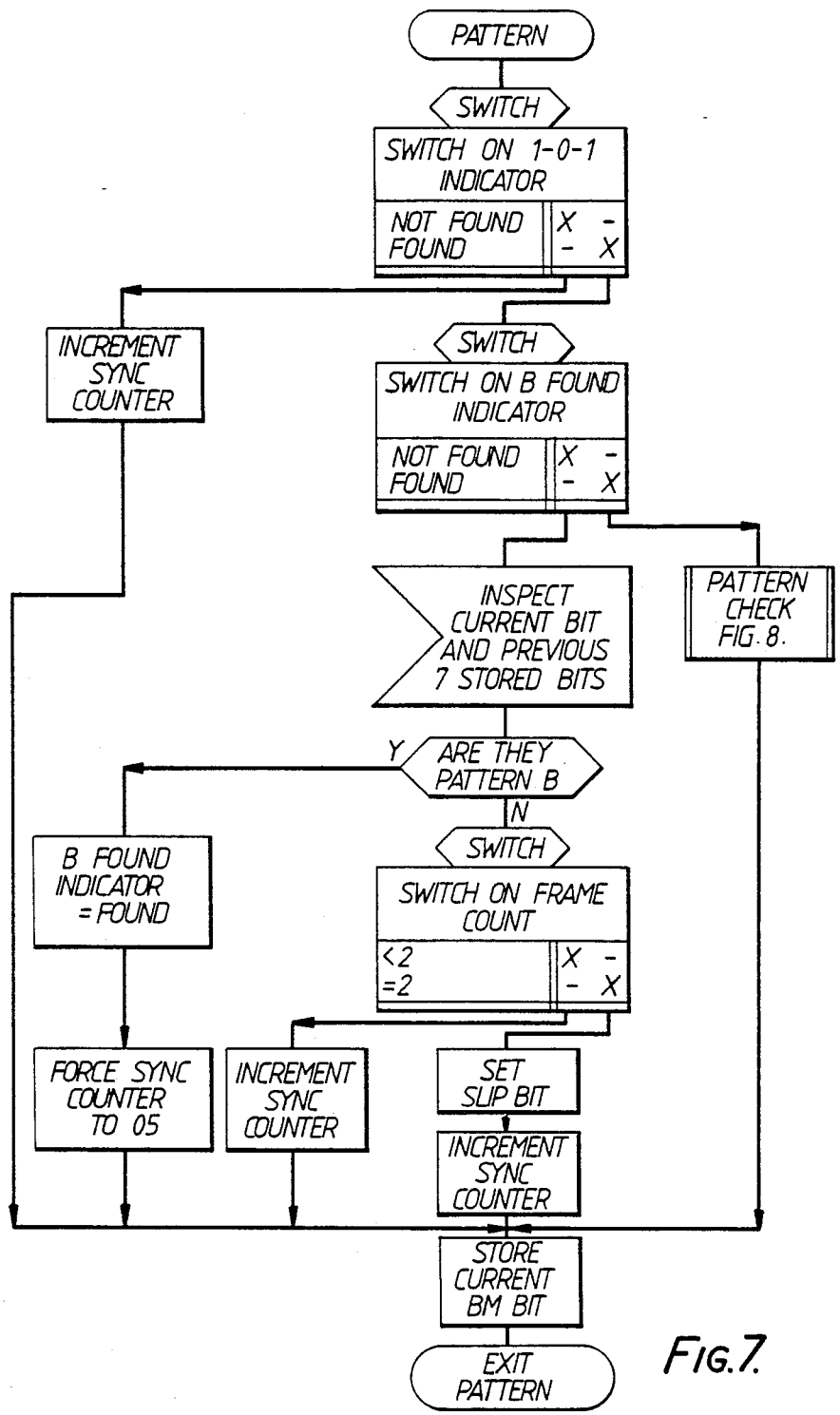
Figure 8:
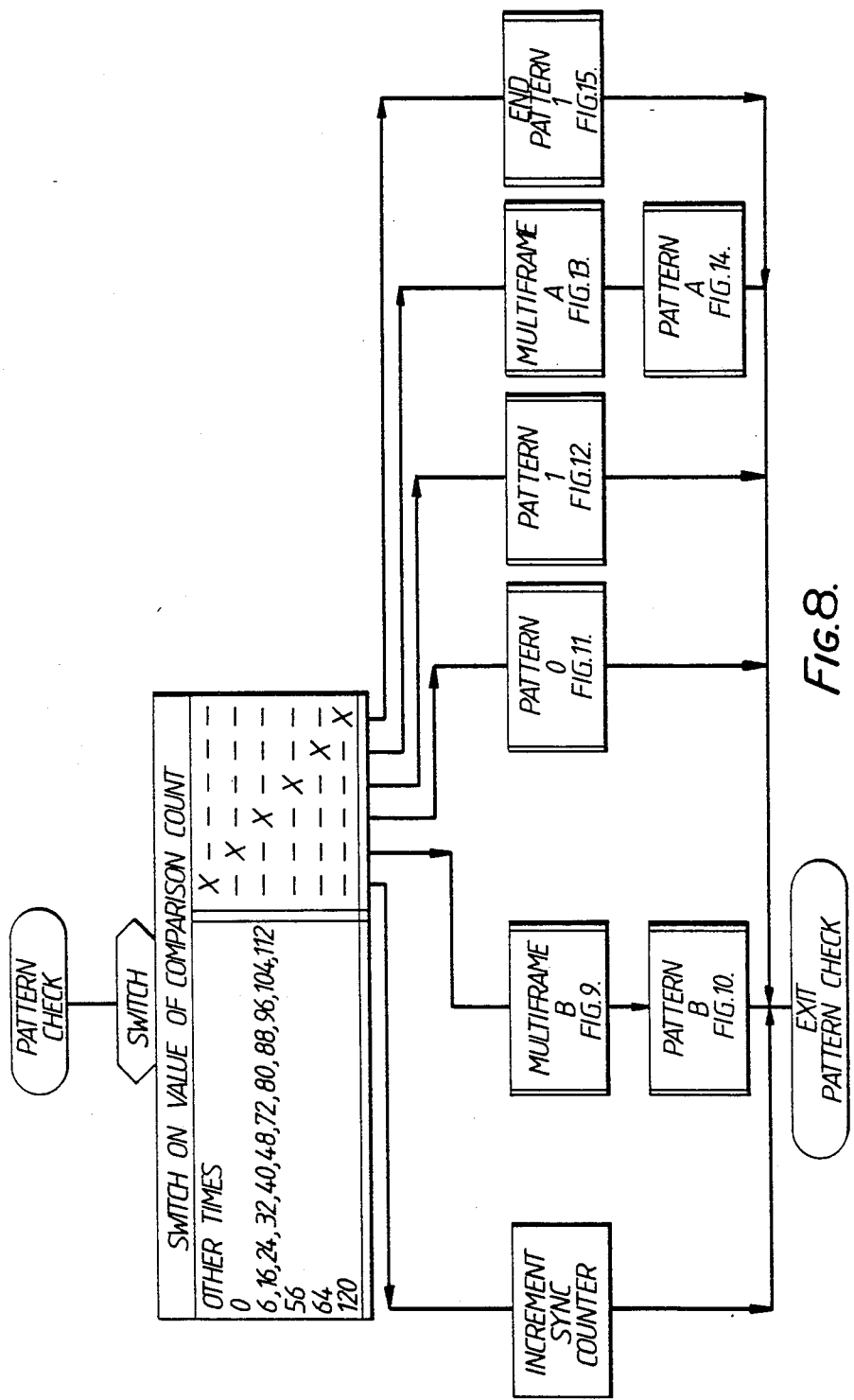
Figure 9:
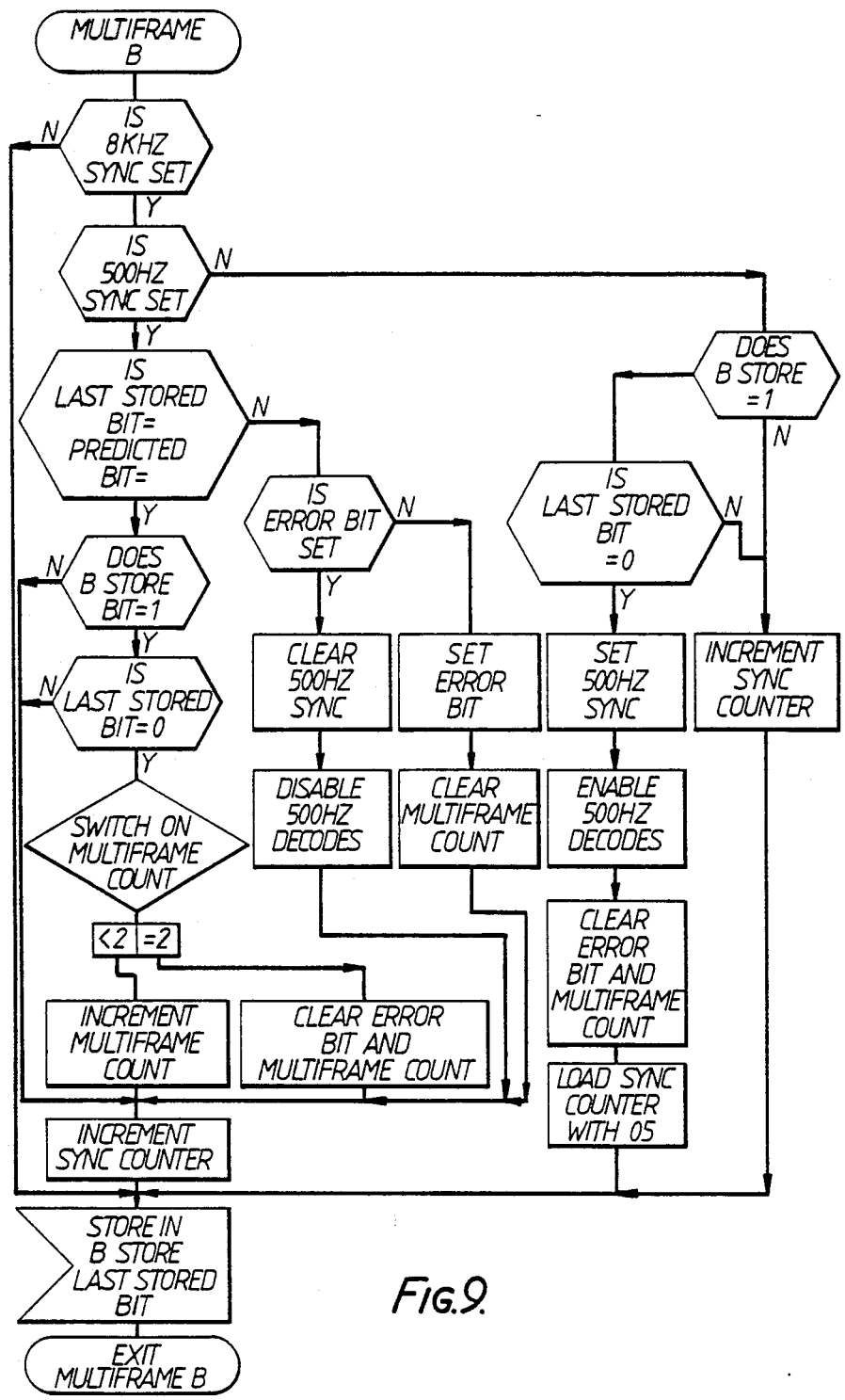
Figure 10:
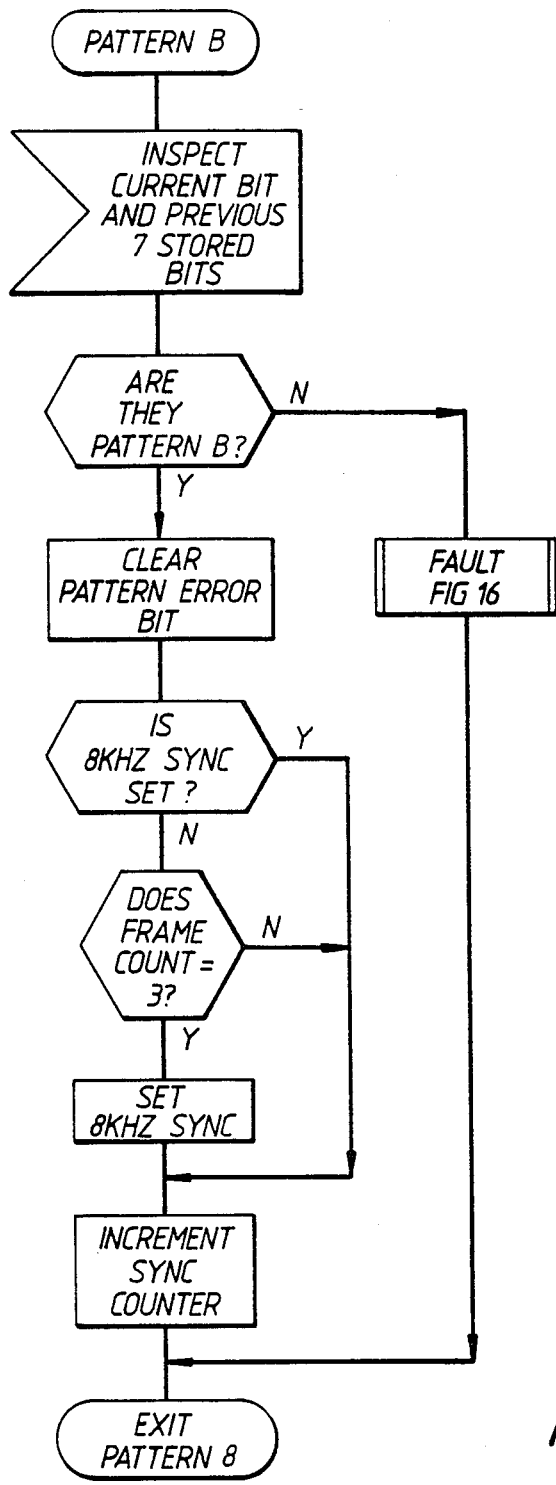
Figure 11:
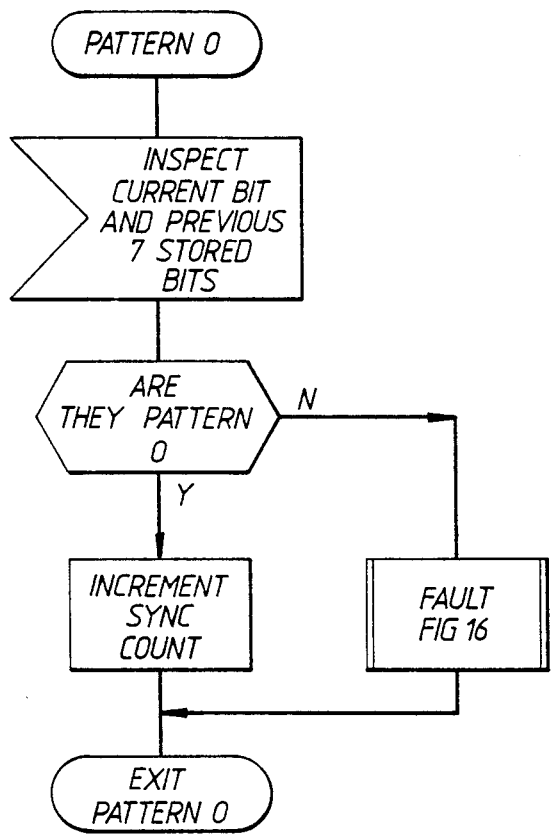
Figure 12:
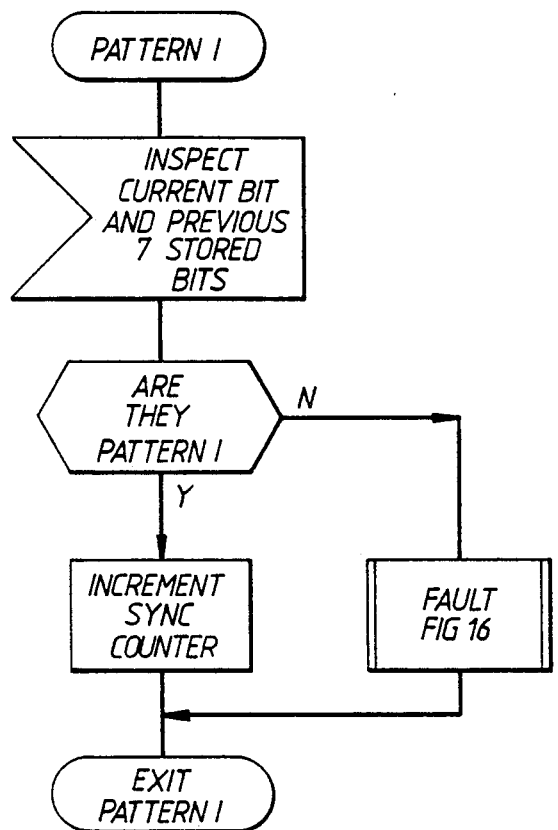
Figure 13:
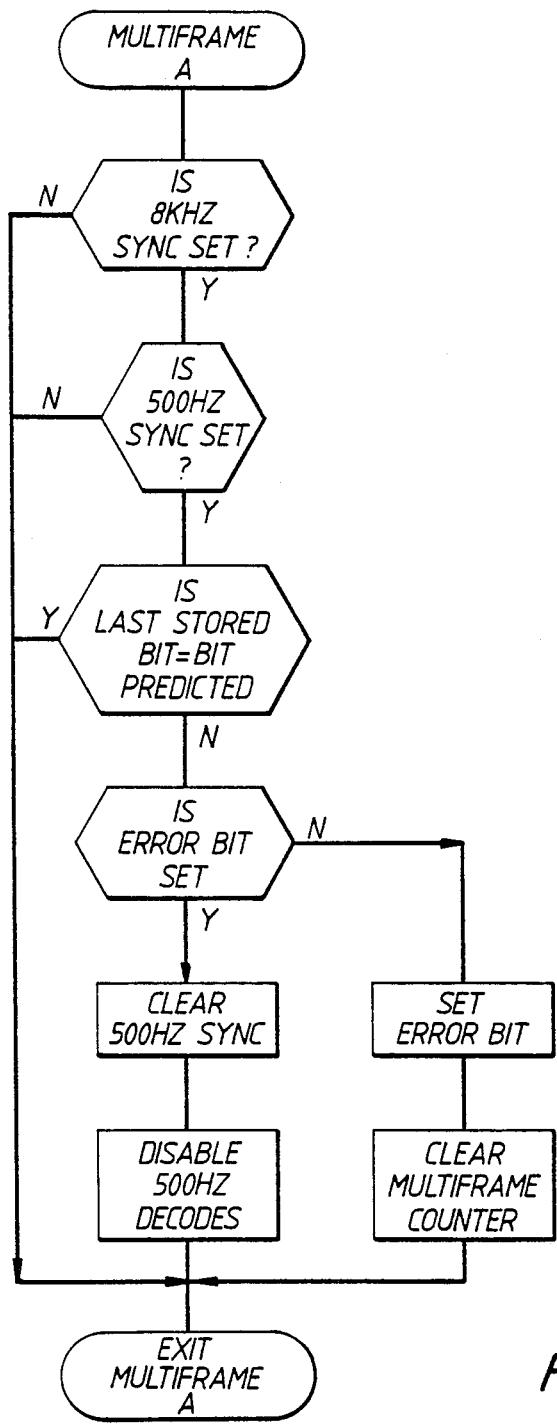
Figure 14:
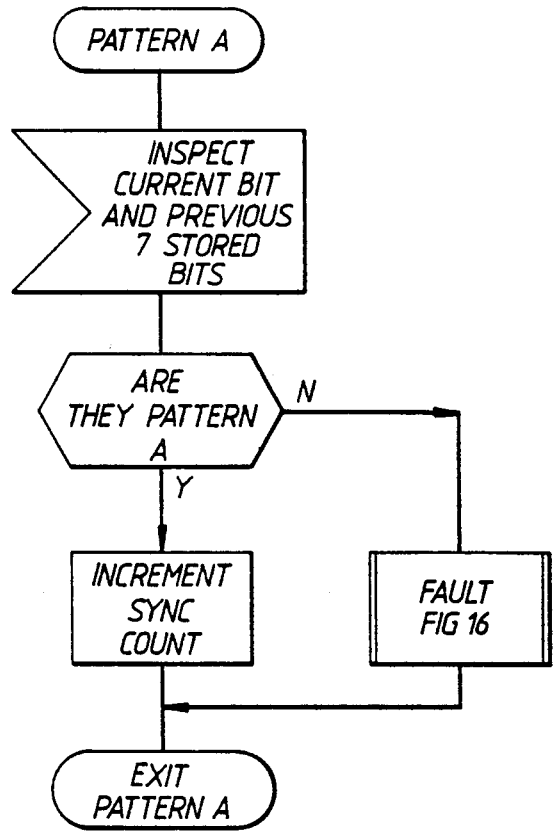
Figure 15:
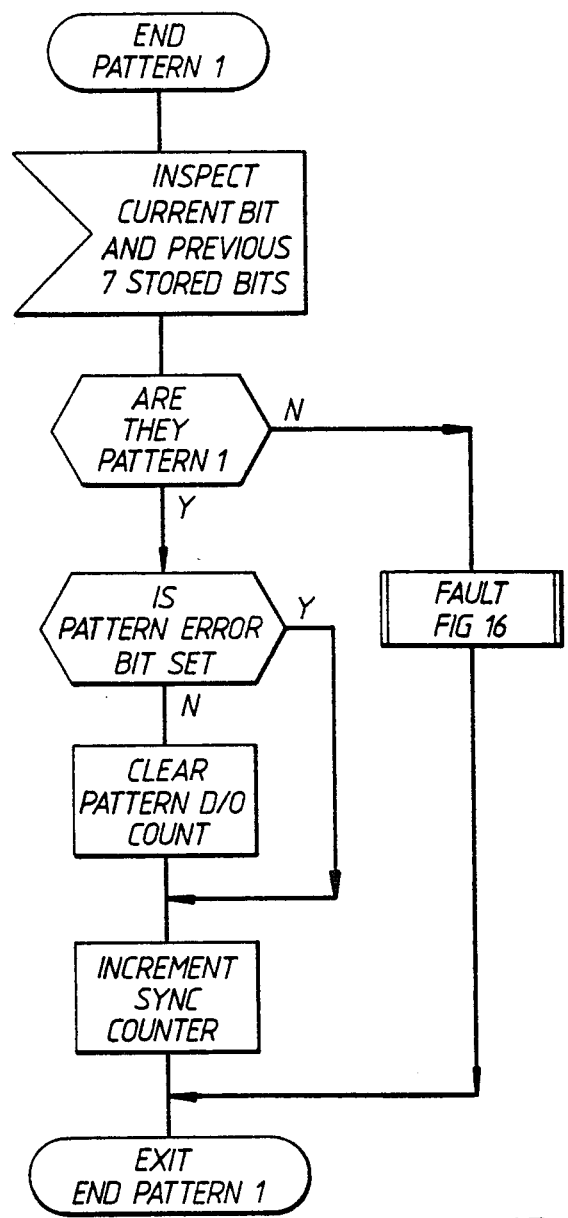
Figure 16:
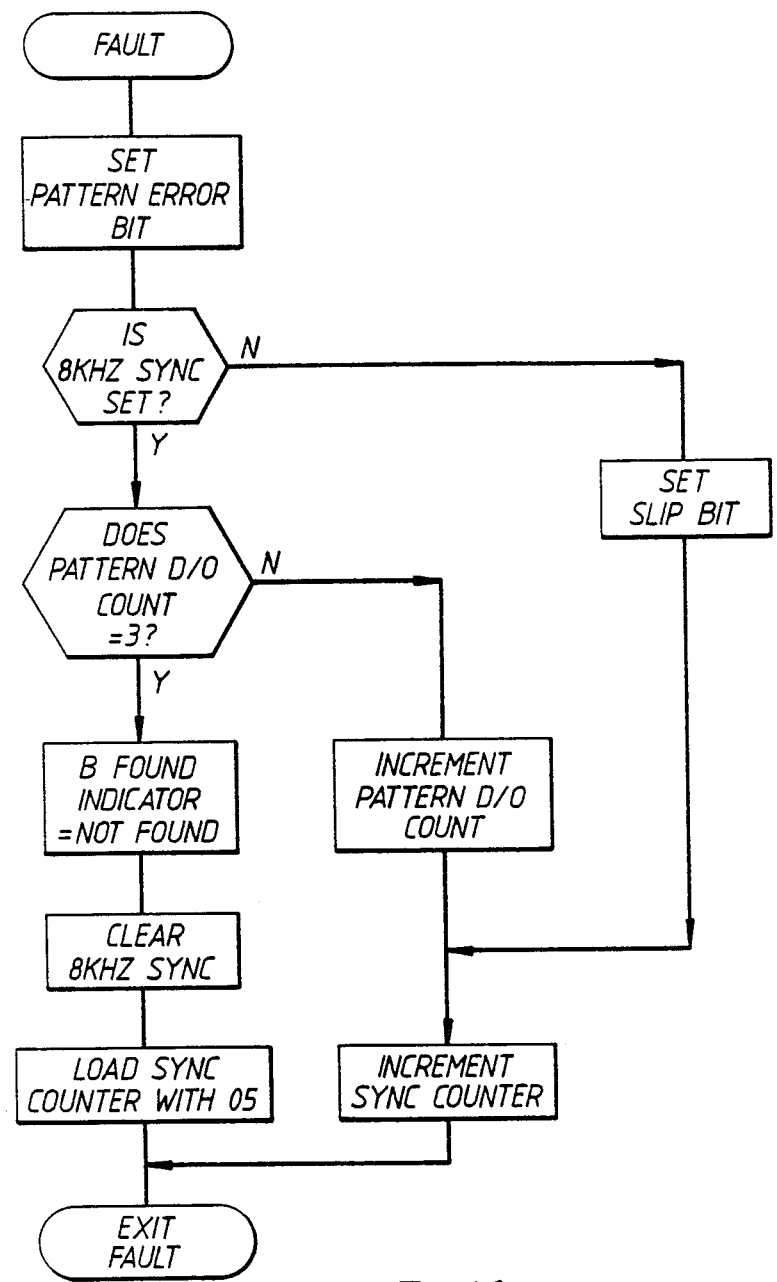
Figure 17:
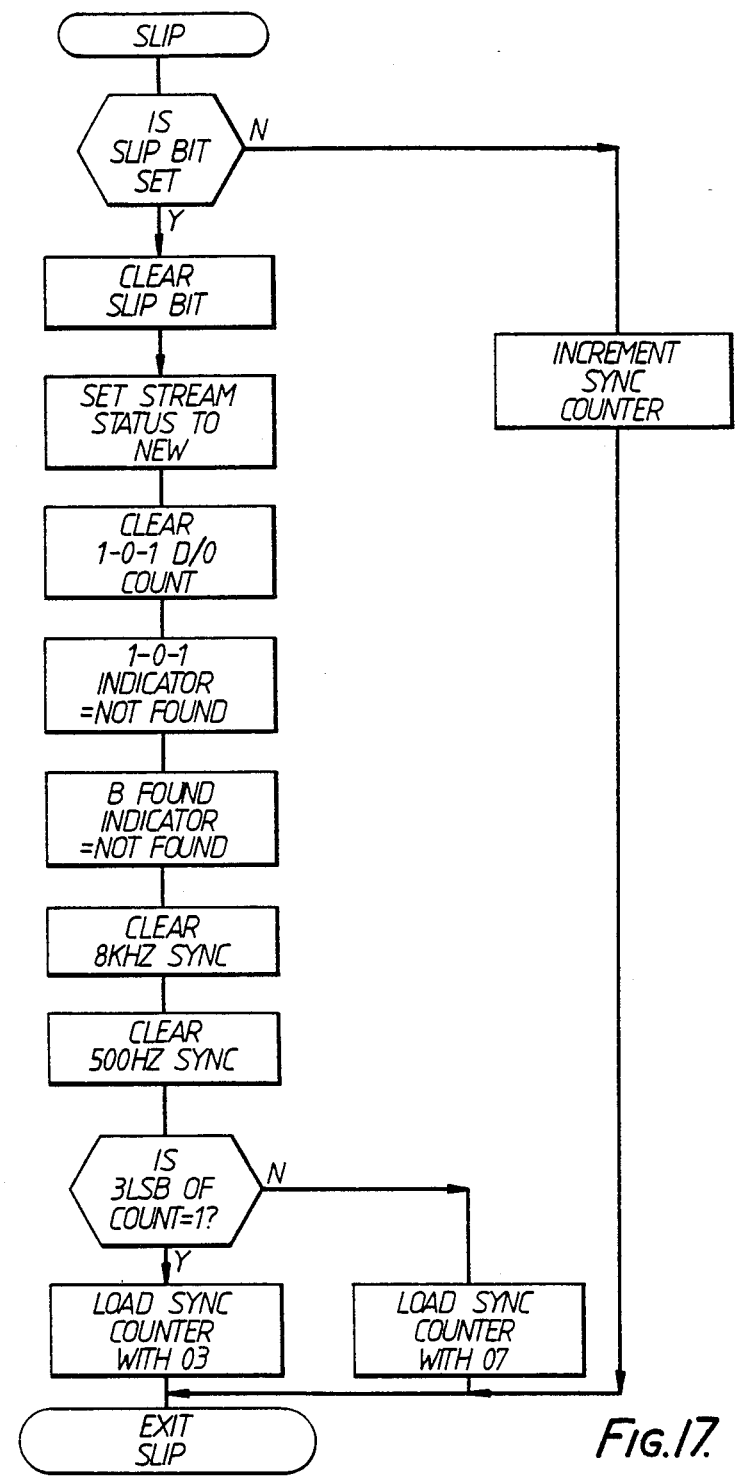
Figure 18:
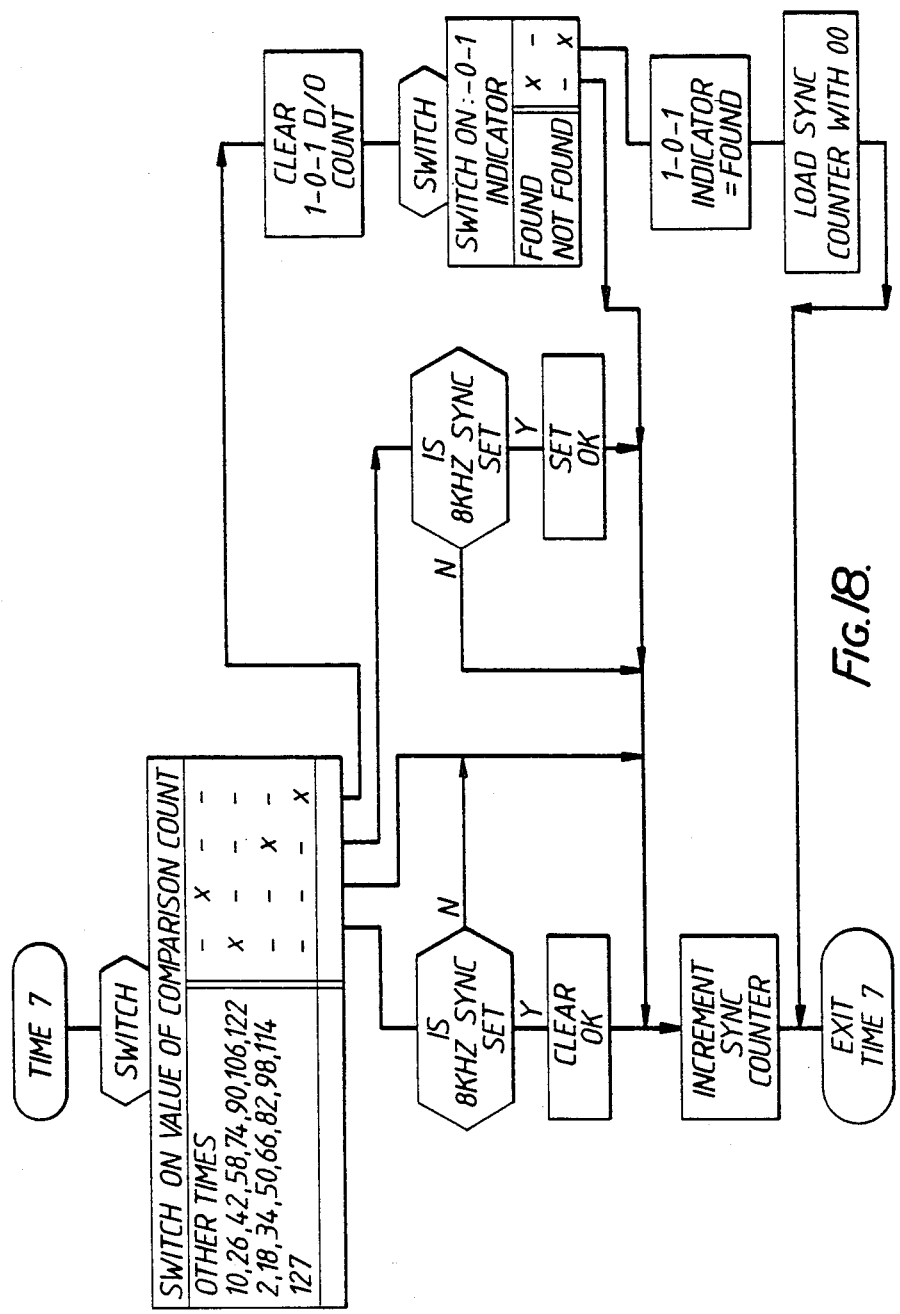
Figure 19:
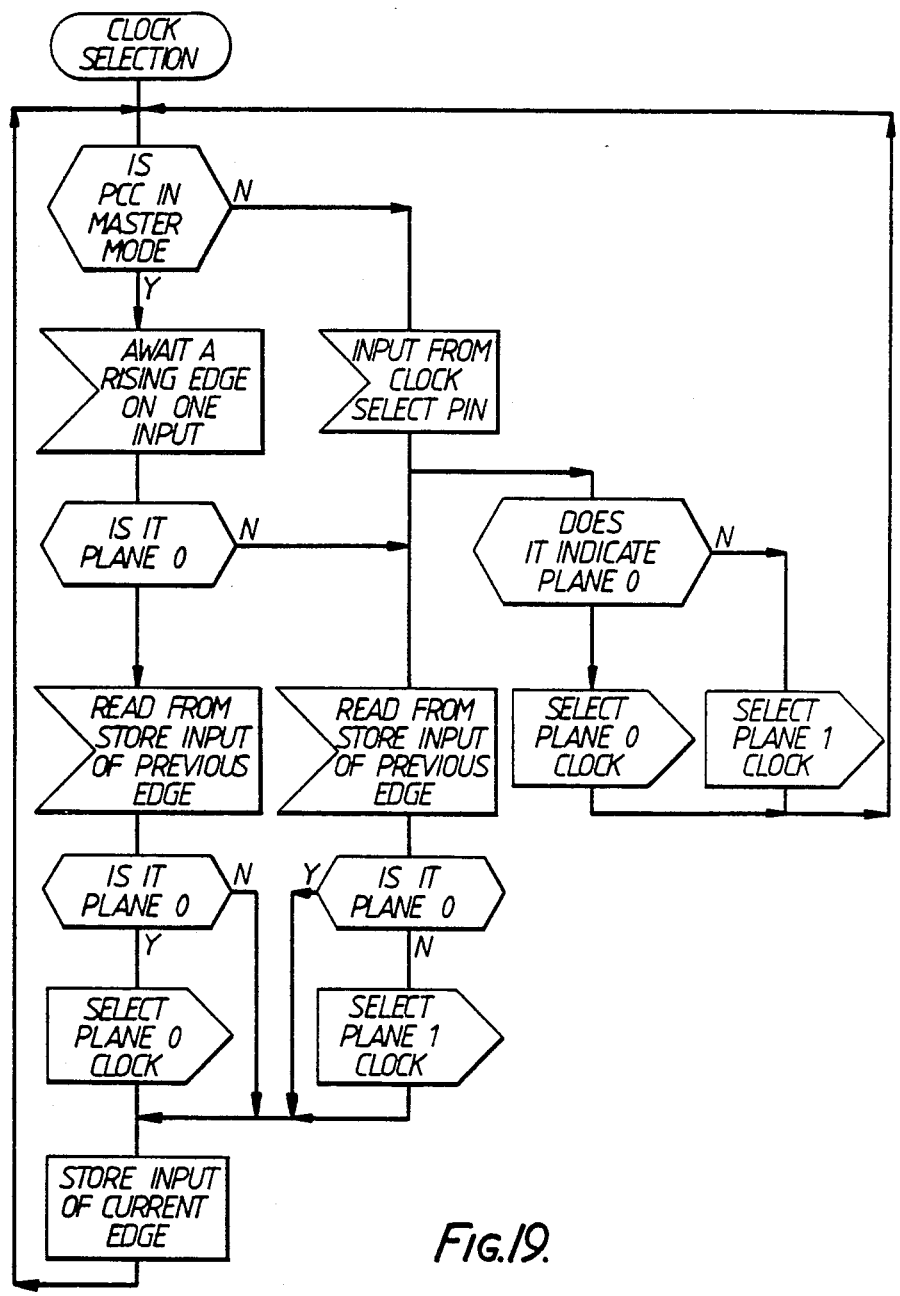

The following text is a description of the progression charts, which are defined on the following figures:

| | |
|---|---|
| SYNC DETECT OUTER LOOP FIG. 4 | |
| 1-0-1 | FIG. 5 |
| 1-0-1 FAIL | FIG. 6 |
| PATTERN | FIG. 7 |
| PATTERN CHECK | FIG. 8 |
| MULTIFRAME B | FIG. 9 |
| PATTERN B | FIG. 10 |
| PATTERN 0 | FIG. 11 |
| PATTERN 1 | FIG. 12 |
| MULTIFRAME A | FIG. 13 |
| PATTERN A | FIG. 14 |
| END PATTERN 1 | FIG. 15 |
| FAULT | FIG. 16 |
| SLIP | FIG. 17 |
| TIME 7 | FIG. 18 |
| CLOCK SELECTION | FIG. 19 |

Sync data

The 2 Mbit/s synchronisation data from the waveform distribution system will contain the following sync patterns:

Sync stream identification pattern

This pattern will be an alternating 0/1 pattern in all odd numbered bits in the sync stream. This will provide a simple sync pattern for the sync detector to lock onto in the 8 Mbit/s data from the switch.

Sync pattern A

This pattern will be a frame and multi-frame reference in the even numbered bits to indicate the position of the Tx frame sync.

Sync pattern B

This pattern will be a frame and multi-frame reference marker in the even numbered bits to provide a reference by which sync pattern A may be validated.

Sync pattern O

A pattern of zeros in the even numbered bits occurring between Sync pattern A or B and the next pattern 1.

Sync pattern 1

A pattern of ones in the even numbered bits that preceed a Sync pattern A and a Sync Pattern B.

Sync detection

After sync loss or power-on the sync detect function of the PCC searches the 8 Mbit/s data from the switch for the 2 Mbit/s sync data stream. Having found the identificaition pattern, Pattern A, Pattern B, Ones and Zeros will then be looked for checking that they occur at the correct time. If they continue to be correct for three frames, the PCC will be considered to be in sync and the OK signal at 8 kHz will continually toggle; if not, the sync detect will return to search for the identification pattern in the 8 Mbit/s data. Once in sync, the identification pattern may contain bits in error in any one frame without loss of sync. If there are a total of four failures in the A, B, Ones or Zeros patterns since the last good frame (i.e. one in which A, B, Ones and Zeros were present with no bit errors and at the correct separation), then sync is lost and the OK 8 kHz signal will be held at a constant level. The algorithm will revert to 'Looking for B' for two frames and if not found will again search for the identification pattern. To find 500 Hz sync, the sync detect looks for the falling transition in the 500 Hz bit in pattern B and uses this to synchronise its counter and set 500 Hz in Sync. Whilst in sync the 500 Hz in pattern A and pattern B will be compared with the predicted state of the 500 Hz from the counter. Should a second fault occur before the second falling edge of the 500 Hz after the first fault, this will cause loss of 500 Hz sync. Only when in sync will the 500 Hz provide an "an OK signal at 500 Hz" signal. When in sync, one sync detector will set a cross-coupled NAND gate and the other detector on the other plane will clear it, so that when both detectors are seeing the same data the output will be a 500 Hz square wave. The two OK signals will be multiplexed into a single OK signal for use by the clock selection function.

PCC CLOCK SELECTION

The PCC has two modes of clock selection, Master Mode and Slave Mode. In slave mode an input is used to force the clock selection a particular way, however, in Master mode the PCC itself determines which clock to select. The following text describes the Master mode of operation.

The PCC achieves clock selection by using information supplied by the Plane 0 Sync Detector and the Plane 1 Sync Detector. For the purpose of clock selection each sync detector has three states:

(1) No Sync Found
(2) 8 kHz Sync Found
(3) 500 Hz Sync Found

Commencing from 'No Sync Found' the detectors search their respective 8 Mbit/s data inputs from the switch plane for the 8 kHz sync data. Once a detector gets to '8 kHz Sync Found' it will try and achieve '500 Hz Sync Found'.

The two detectors are totally independent such that the progress of one through the states has no effect on the other.

Finding and losing 500 Hz Sync has no effect on '8 kHz Sync Found' and if 8 kHz Sync is lost then 500 Hz Sync is also lost.

| No 8 kHz Sync | → | 8 kHz Sync | → | 8 kHz Sync |
| No 500 Hz Sync | ← | No 500 Hz Sync | ← | 500 Hz Sync |
| STATE 1 | | STATE 2 | | STATE 3 |

Each Sync detector has an input into the clock selection. If the detector is in 'State 1' then this input is stead state, ie fixed at either high or low. However, if in 'State 2' or 'State 3' this input pulses. The pulse pattern is repreated every 125 μs and there are a possible eight pulses. Seven of these occur if 'State 2' is reached and the eighth only occurs if 'State 3' is achieved. Plane 0 pulses high and plane 1 pulses low such that the selector will usually see a rising edge alternatively from plane 0 and then from plane 1.

If the selector sees two or more consecutive rising edges from the same plane then it will select the clock from that plane. For example, if plane 0 is in 'State 2' and plane 1 has just achieved 'State 3' then plane 0 will not have the eighth pulse whereas plane 1 will and two consecutive edges will appear on the plane 1 input causing the selector to choose plane 1 clocks. If plane 1 subsequently fell back to 'State 2' and plane 0 was still at 'State 2' the selector would not be affected, however if plane 1 went to 'State 1' then plane 0 would supply two consecutive edges and the selector would change to choosing the clock from plane 0.

The selector will only change to the other plane if that plane supplies two consecutive edges.

Figure 20:
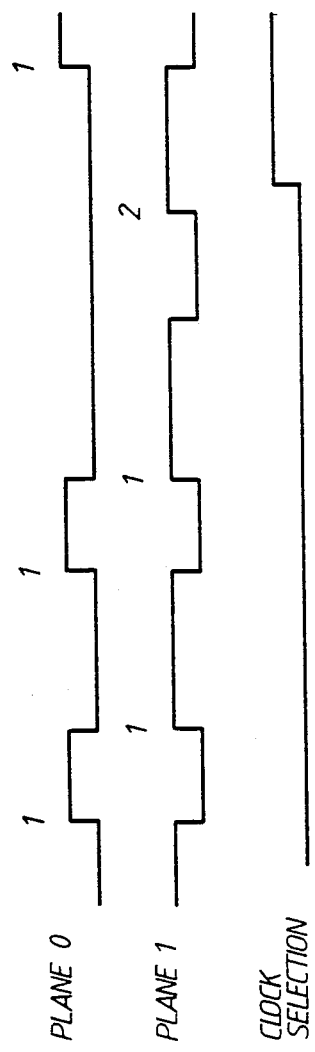
FIG. 20 shows the plane and clock selection waveforms; and, FIG. 21 shows a logic diagram of the arrangements for enabling of the means to select the synchronised serial data multiplex stream in accordance with this invention.

FIG. 20 shows the plane and clock selection waveforms.

FIG. 21 shows the logic diagram for a periphereal card controller PCC clock selector. The two signals A and B represent OK signals and are processed by the logic circuitry to form the select signal C. It will be appreciated that the logic used is standard logic and its function will readily be appreciated by those skilled in the art.

The above description is not intended to limit the scope of the present invention. Alternative implementations may be envisaged by those skilled in the art. For example, information may be transmitted at different rates and over different mediums than those discussed, and each rate can be detected and checked in a similar manner to that already described.

We claim:

1. A synchronisation arrangement for a digital telecommunications exchange system of the type including duel secure digital switching networks, the arrangement comprising, secure waveform and synchronisation information generating means for supplying secured synchronisation information for transmission within a serial multiplex data stream over each digital switching network of said secure digital switching network, the synchronisation information including first and second different independently encoded synchronisation patterns which are phase displaced with respect to each other by a predetermined amount, and a plurality of interface means connected between said secure digital switching networks and a corresponding plurality of peripheral devices, wherein each interface means is adapted to detect and validate said synchronisation information from each secure digital switching network independently by checking for (a) first and second encoded synchronisation patterns, (b) the predetermined amount of phase displacement and (c) that the first and second synchronisation patterns are in the correct sequence, wherein in the event of the synchronisation information from one secure digital switching network being invalid, said interface means is enabled to select the synchronised serial multiplex data stream from the other secure digital switching network exclusively for use by its corresponding peripheral device.

2. A synchronisation arrangement as claimed in claim 1, wherein the first synchronisation pattern provides a frame and multiframe reference in even numbered bits to indicate the position of a transmit frame synchronisation.

3. A synchronisation arrangement as claimed in claim 1, wherein the second synchronisation pattern is a frame and multi-frame reference marker in even numbered bits providing a reference by which the first pattern is validated.

4. A synchronisation arrangement as claimed in claims 2 or 3, wherein the first synchronisation patterns are generated by first and second majority voting circuits respectively.

5. A synchronisation arrangement as claimed in claim 4, wherein the first and second synchronisation patterns are preceeded by a pattern of 1's in the even numbered bits.

6. A synchronisation arrangement as claimed in claim 5, wherein a pattern of 0's in the even numbered bits occurs between the first or second synchronisation pattern and a succeeding pattern of 1's.

* * * * *